United States Patent [19]

Ruder et al.

[11] Patent Number: 5,174,708

[45] Date of Patent: Dec. 29, 1992

[54] BOOM MOUNTED MULTIPLE STAGE FREIGHT LIFT APPARATUS

[75] Inventors: Carl J. Ruder; Ronald J. Haney, both of Overland Park, Kans.

[73] Assignee: Yellow Freight System, Inc., Overland Park, Kans.

[21] Appl. No.: 735,360

[22] Filed: Jul. 24, 1991

Related U.S. Application Data

[60] Continuation-in-part of Ser. No. 640,995, Jan. 14, 1991, Pat. No. 5,088,873, which is a division of Ser. No. 280,720, Dec. 6, 1988, Pat. No. 5,009,560.

[51] Int. Cl.⁵ .............................................. E02F 3/36
[52] U.S. Cl. ...................... 414/392; 414/399; 414/666; 414/667; 414/672
[58] Field of Search .................. 414/373, 390-393, 414/395, 398, 399, 527, 528, 540-543, 560, 561, 663-672, 687, 688, 689, 690, 718, 728

[56] References Cited

U.S. PATENT DOCUMENTS

| | | |
|---|---|---|
| 901,949 | 10/1908 | Brown et al. |
| 1,626,948 | 5/1927 | Manierre |
| 2,660,432 | 11/1953 | Wilske et al. |
| 2,843,278 | 7/1958 | Qveflander |
| 3,106,305 | 10/1963 | Gehring ............... 414/666 |
| 3,209,926 | 10/1965 | McWilliams |
| 3,379,325 | 4/1968 | Frey ..................... 414/689 |
| 3,442,403 | 5/1969 | Weir |
| 3,572,530 | 3/1971 | Ohntrup et al. ........ 414/666 |
| 3,613,910 | 10/1971 | Weir |
| 3,647,099 | 3/1972 | Carriere ............. 414/728 X |
| 3,651,963 | 3/1972 | McWilliams |
| 3,672,526 | 6/1972 | Hansen ................ 414/666 |

(List continue on next page.)

FOREIGN PATENT DOCUMENTS

| | | | |
|---|---|---|---|
| 86570 | 11/1958 | Denmark ............... 414/662 |
| 29817 | 6/1981 | European Pat. Off. |
| 306637 | 3/1989 | European Pat. Off. ............ 414/665 |
| 1431034 | 5/1969 | Fed. Rep. of Germany ...... 414/666 |
| 2249622 | 4/1973 | Fed. Rep. of Germany ...... 414/665 |
| 2231495 | 1/1974 | Fed. Rep. of Germany |
| 2327047 | 12/1974 | Fed. Rep. of Germany ...... 414/666 |

(List continued on next page.)

OTHER PUBLICATIONS

Standard Lift Truck Systems w/*Versalift* action, Standard MfrCo. Received by PTO before Oct. 1979.
Hartley, John; "Specialisation Is The Watchword on Tokyo Robot Show Stands"; *The Engineer;* Nov. 3, 1977; pp. 65-67.

Primary Examiner—Michael S. Huppert
Assistant Examiner—Robert S. Skatz
Attorney, Agent, or Firm—Litman, McMahon & Brown

[57] ABSTRACT

A freight manipulation includes a tracked chassis with an articulated cantilever boom extending therefrom which is capable of swinging about a horizontal tilt axis. A tool carriage, mounted at the end of the boom by a multiple stage lift mast, has a pair of freight engaging tools thereon. the telescoping mast includes an upper frame connected to the boom for pivoting about a vertical axis, a middle frame, and a lower frame having the tool carriage slidably mounted thereon. A pair of secondary lift cylinders are connected between the upper and middle frames. A pair of secondary lift chains are connected between the upper and lower frames and engage pulleys on the middle frame such that as the secondary cylinders extend or retract to respectively lower or raise the middle frame, the lower frame is lowered or raised relative to the middle frame. A primary lift cylinder is connected to the lower frame, and a pair of primary lift chains engaging pulleys on a ram of the primary cylinder are connected between the lower frame and the tool carriage whereby the tool carriage is lowered or raised as the primary cylinder is respectively extended or retracted.

5 Claims, 7 Drawing Sheets

U.S. PATENT DOCUMENTS

| | | |
|---|---|---|
| 3,715,043 | 2/1973 | Weir . |
| 3,716,158 | 2/1973 | Hansen ............................... 414/666 |
| 3,762,588 | 10/1973 | Hansen et al. ...................... 414/666 |
| 3,779,404 | 12/1973 | McWilliams . |
| 3,782,566 | 1/1974 | McWilliams . |
| 3,785,508 | 1/1974 | Hayden . |
| 3,788,496 | 1/1974 | Webb et al. . |
| 3,792,785 | 2/1974 | Weir . |
| 3,811,579 | 5/1974 | Black . |
| 3,819,068 | 6/1974 | Weir . |
| 3,827,585 | 8/1974 | McWilliams . |
| 3,842,962 | 10/1974 | Grachev et al. . |
| 3,853,230 | 12/1974 | Schultz . |
| 3,863,021 | 9/1974 | McWilliams . |
| 3,866,768 | 2/1975 | Weir . |
| 3,937,346 | 2/1976 | Van der Laan . |
| 3,952,887 | 4/1976 | Lutz . |
| 3,984,019 | 10/1976 | Brudi et al. ..................... 414/666 X |
| 3,998,345 | 12/1976 | Fiehler et al. .................. 414/666 X |
| 3,998,346 | 12/1976 | Gibson et al. ....................... 414/666 |
| 4,039,094 | 8/1977 | Grove ............................ 414/690 X |
| 4,082,197 | 4/1978 | Stedman ............................. 414/687 |
| 4,088,221 | 5/1978 | Bowser . |
| 4,113,123 | 9/1978 | Jeffrey ......................... 414/687 X |
| 4,128,183 | 12/1978 | Finlayson . |
| 4,171,178 | 10/1979 | Birkenfeld et al. . |
| 4,189,271 | 2/1980 | Hasegawa . |
| 4,201,511 | 5/1980 | Charles ......................... 414/690 X |
| 4,252,495 | 2/1981 | Cook . |
| 4,281,955 | 8/1981 | McWilliams . |
| 4,425,069 | 1/1984 | Saur et al. . |
| 4,505,635 | 3/1985 | Sineda et al. ..................... 414/667 |
| 4,632,630 | 12/1986 | Maki et al. ..................... 414/718 X |
| 4,718,814 | 1/1988 | Addleman ....................... 414/671 X |
| 4,755,102 | 7/1988 | Merlo .............................. 414/690 X |
| 4,780,041 | 10/1988 | Ashby, Jr. . |
| 4,783,904 | 11/1988 | Kimura . |
| 4,787,803 | 11/1988 | van Elten et al. . |
| 4,822,237 | 4/1989 | Meyer et al. .................... 414/718 X |
| 4,832,559 | 5/1989 | Gebbardt . |
| 4,896,748 | 1/1990 | Mikkelsen et al. . |
| 4,964,778 | 10/1990 | Muto et al. ..................... 414/728 X |
| 5,036,952 | 8/1991 | Harper ............................ 414/665 X |
| 5,082,090 | 1/1992 | Walker ............................ 414/631 X |

FOREIGN PATENT DOCUMENTS

| | | |
|---|---|---|
| 2327048 | 12/1974 | Fed. Rep. of Germany ...... 414/666 |
| 2352738 | 12/1977 | France . |
| 724904 | 11/1966 | Italy ..................................... 414/666 |
| 58-193834 | 11/1983 | Japan . |
| 59-31224 | 2/1984 | Japan . |
| 61-211237 | 9/1986 | Japan . |
| 62-275930 | 11/1987 | Japan . |
| 63-71031 | 3/1988 | Japan . |
| WO88065567 | 9/1988 | PCT Int'l Appl. . |
| 89-02410 | 3/1989 | PCT Int'l Appl. ................. 414/663 |
| 7707862 | 1/1979 | Sweden . |
| 639919 | 12/1983 | Switzerland . |
| 109132 | 10/1956 | U.S.S.R. ............................... 414/669 |
| 228606 | 1/1969 | U.S.S.R. . |
| 1493608 | 7/1989 | U.S.S.R. ............................... 414/345 |

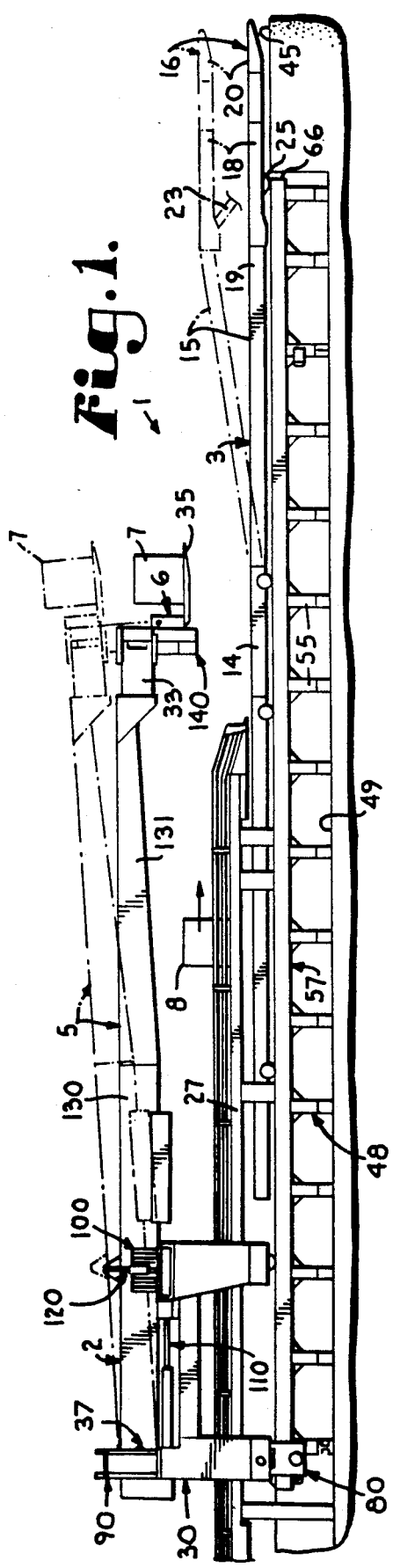

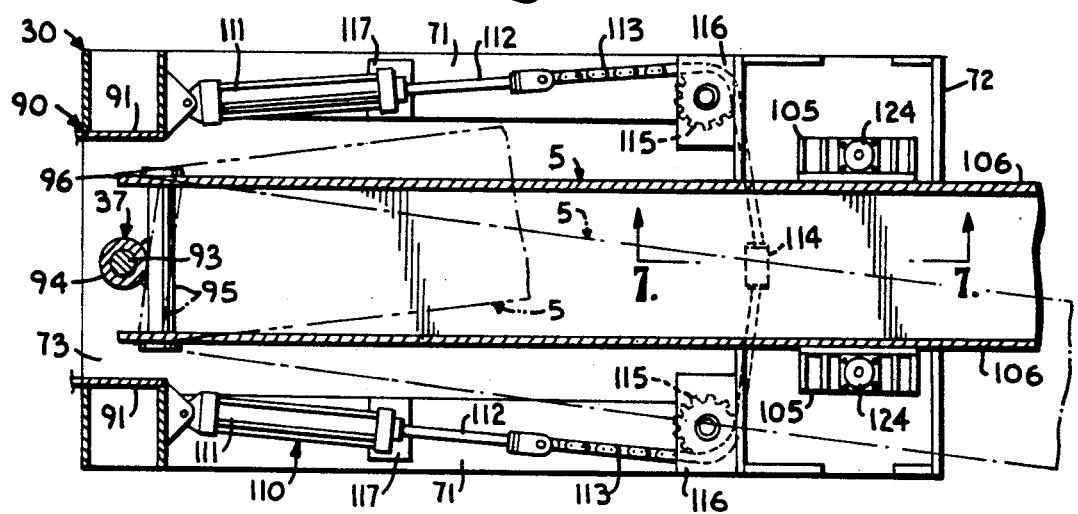
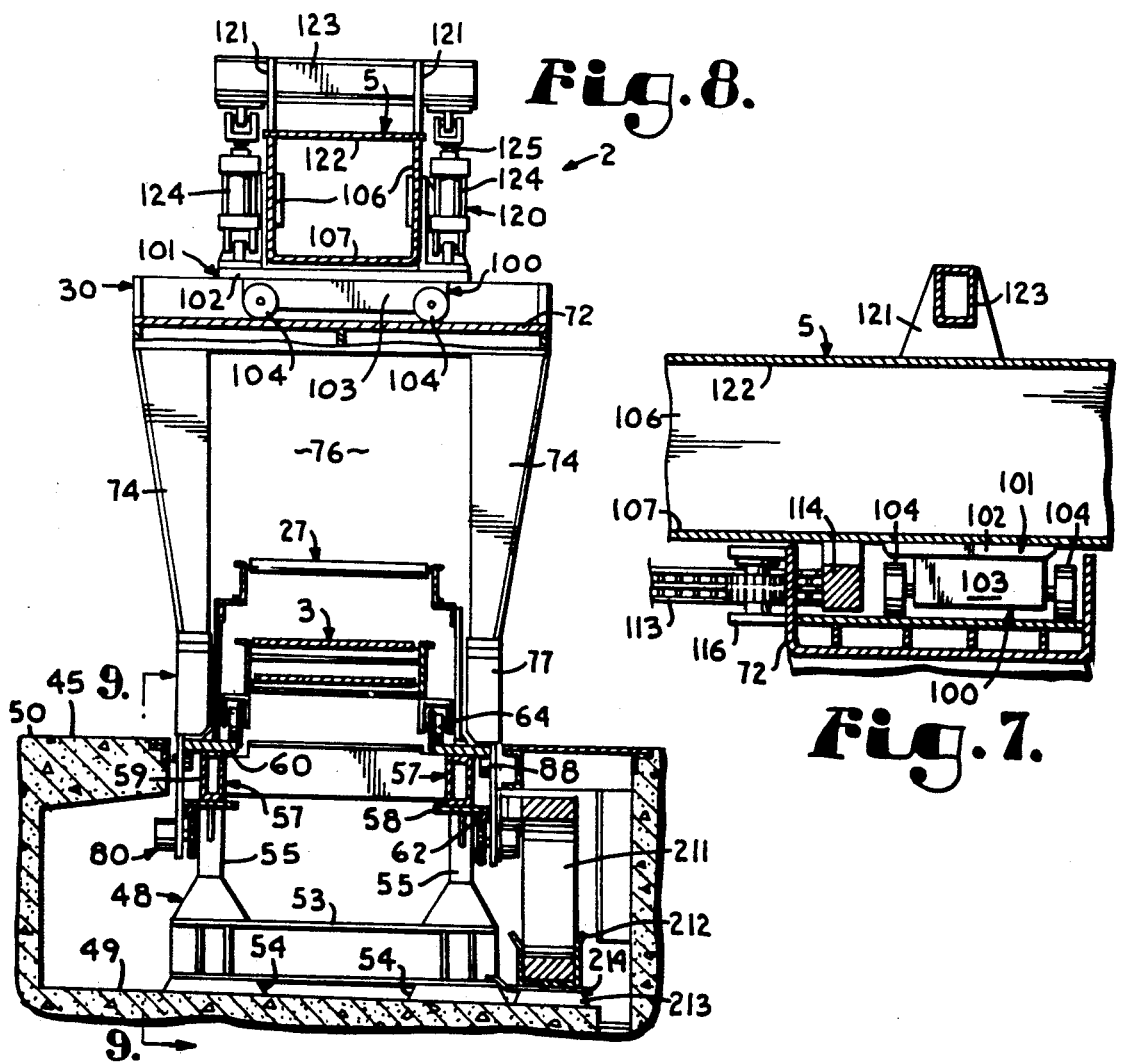

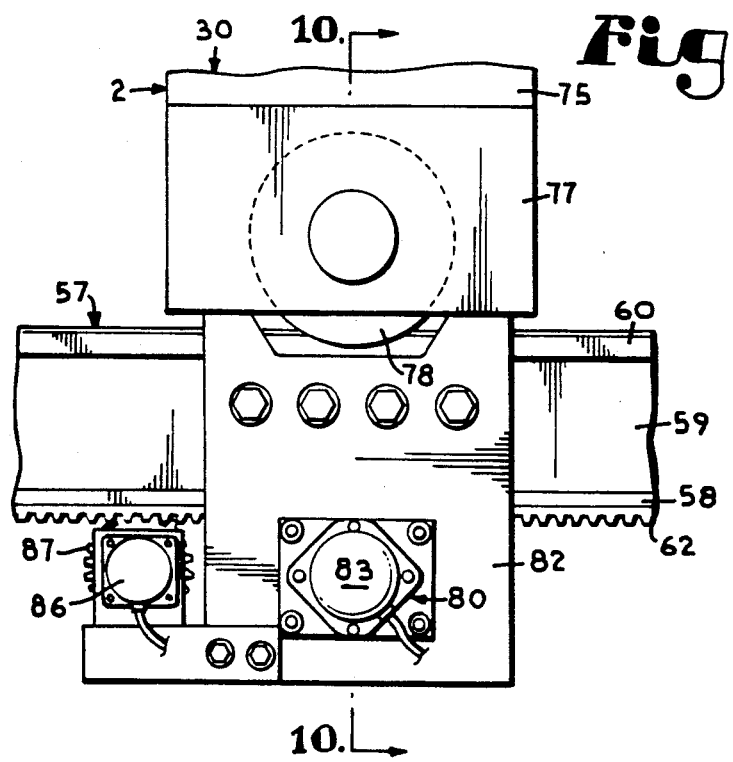
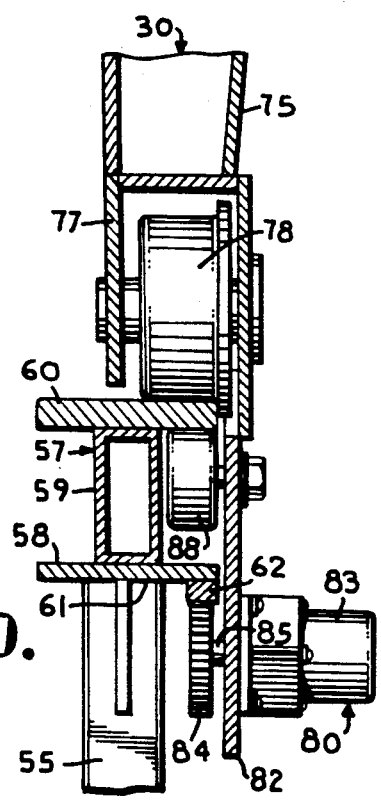
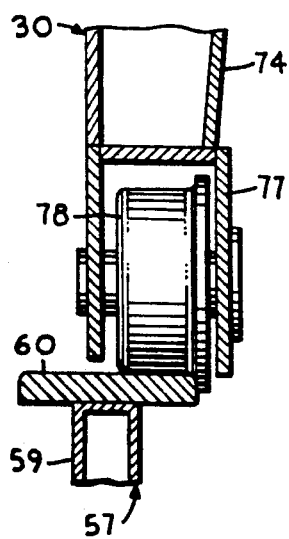
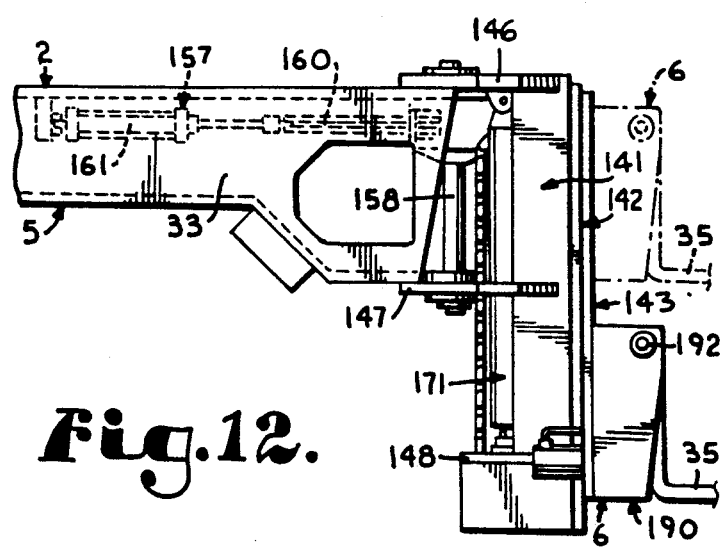
Fig. 9.
Fig. 10.
Fig. 11.
Fig. 12.

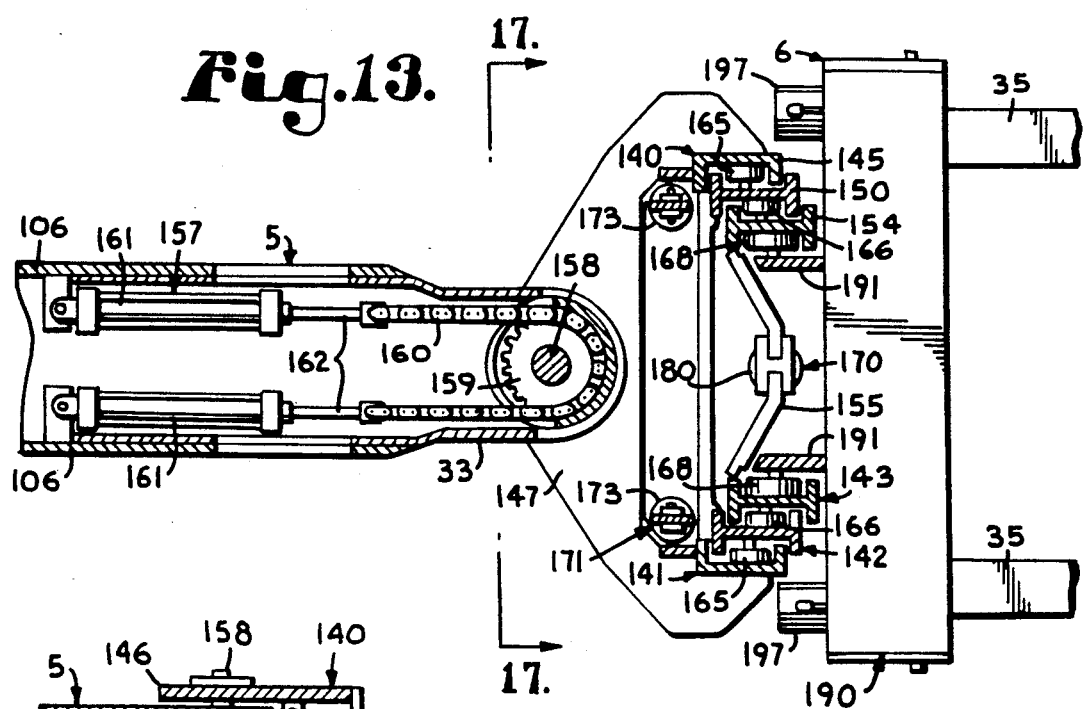
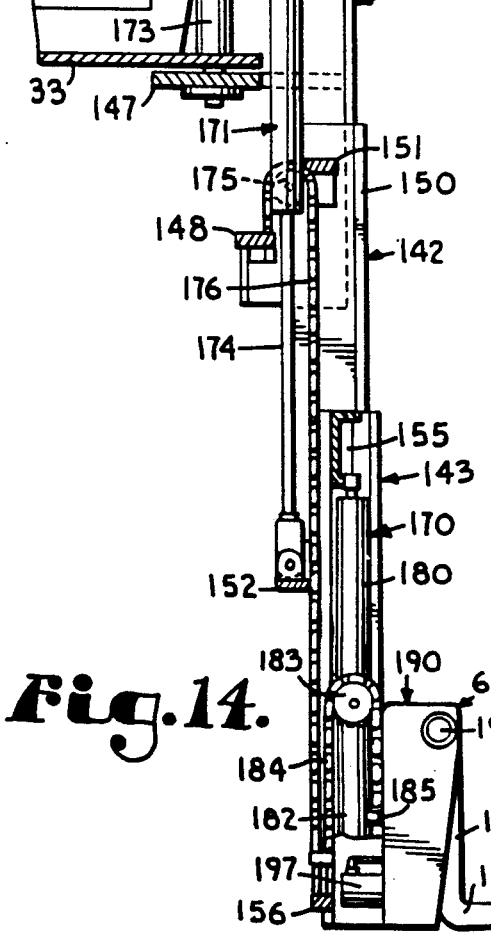
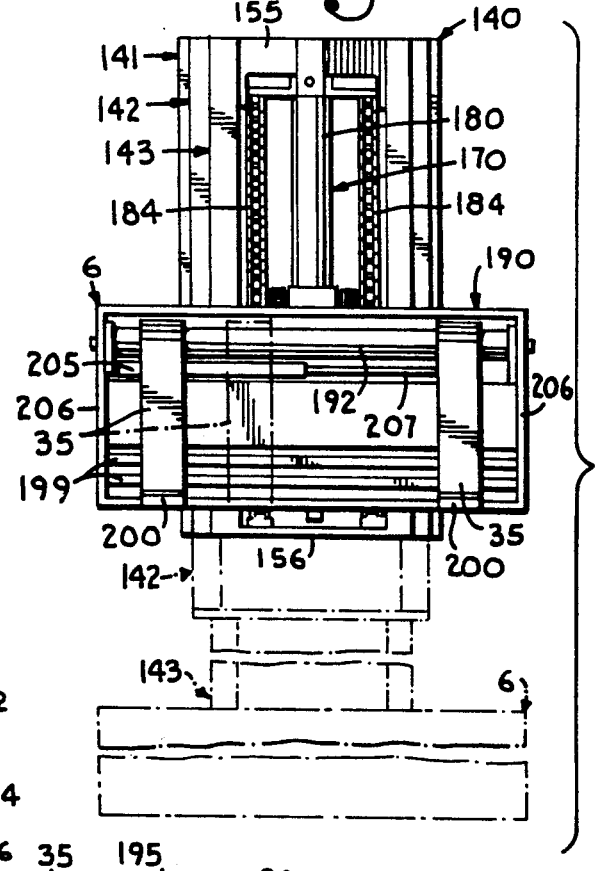

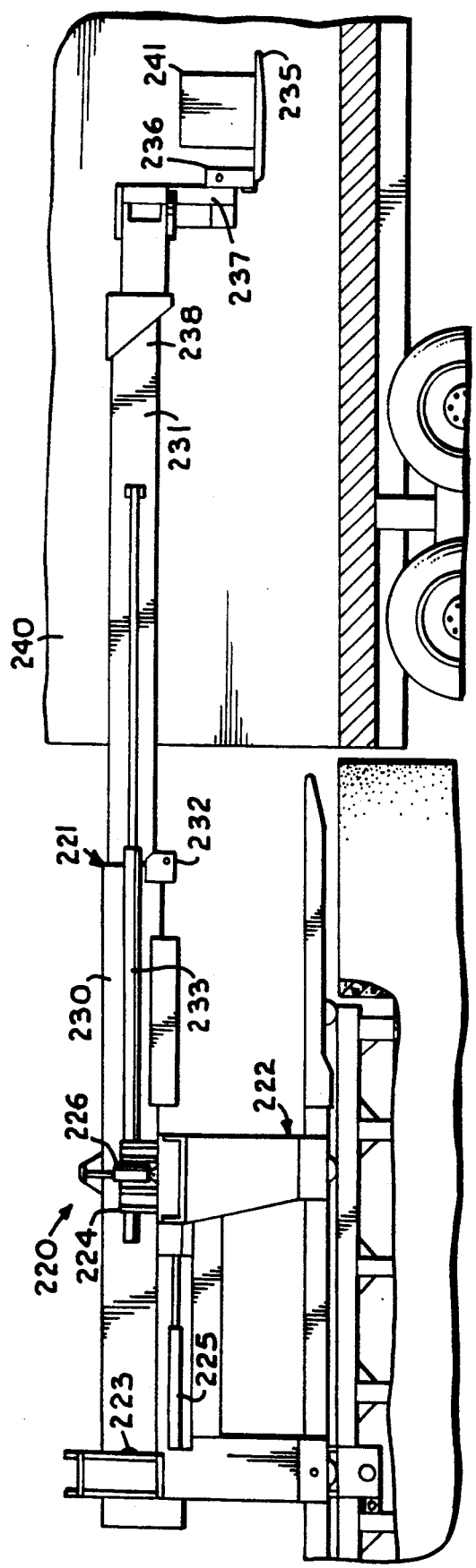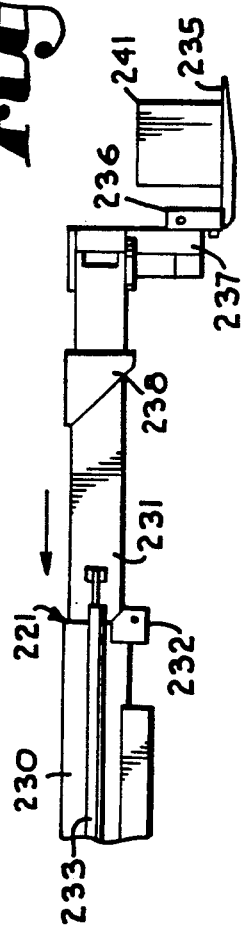

BOOM MOUNTED MULTIPLE STAGE FREIGHT LIFT APPARATUS

CROSS-REFERENCE TO RELATED APPLICATION

This is a continuation-in-part of copending application, Ser. No. 07/640,995 filed Jan. 14, 1991 and entitled MANIPULATOR FOR MIXED FREIGHT HANDLING SYSTEM, now U.S. Pat. No. 4,088,873, which is a division of application, Ser. No. 07/280,720 filed Dec. 6, 1988 and entitled MIXED FREIGHT HANDLING SYSTEM, now U.S. Pat. No. 5,009,560.

FIELD OF THE INVENTION

The present invention relates to article shipping and handling systems and, more particularly, to a freight manipulator apparatus, for such a system, which incorporates a multiple stage lift apparatus mounted on the end of a boom thereof.

BACKGROUND OF THE INVENTION

There are many systems available and in use for efficiently loading and unloading truck trailers with relatively uniform types of freight. For example, if a trailer is loaded with only hand liftable cartons, the trailer may be unloaded entirely manually, as onto pallets on a dock; or a conveyor may be extended into the trailer and the cartons manually placed onto the conveyor. Similarly, if a trailer is loaded with only palleted freight, it may be unloaded fairly efficiently using a conventional fork lift truck.

In some trucking operations, particularly larger general freight carriers, a great variety of freight may be shipped from a number of diverse origins to a central facility for local or distant transshipment. At the central facility, freight from the arriving trucks is unloaded, sorted according to destination, then reassembled into loads in such a manner as to most economically utilize the trucks. Because of the nature of this kind of shipping operation, trucks often arrive at a central facility with mixed freight loads, hand liftable articles interspersed with palleted freight and other types of bulky or heavy articles which are not suitable for manual unloading. Such mixed freight loads are often referred to as "LTL" freight for "Less (than) Truck Load".

In the past, the utilization of labor and equipment in loading and unloading such LTL trailers has often been inefficient and uneconomical. Because of the indeterminate mix of manually liftable freight and freight requiring mechanized handling and possible uncertainty of arrival times of trucks, it is often difficult to provide an optimum combination of labor and equipment for unloading such trucks to assure that the laborers are not overworked at certain times and left idle at others. On some docks, only certain designated persons may be permitted to operate fork lift trucks. Also, a single fork lift truck or conveyor may be required to service multiple dock positions. As different types of freight are encountered in loading or unloading the trailer, workers are often left standing about idly as equipment is awaited and changeover thereof occurs. If conveyors are employed in the trailers for manually liftable articles, time and effort are consumed in extending and retracting the conveyors when a fork lift is required to handle heavier freight.

In loading truck trailers with mixed types of freight for offloading at several locations, it is desirable to position the freight in such a manner as to minimize handling at each stop. Thus, a load for a first stop is positioned rearmost in the trailer, and a load for a last stop is positioned toward the front of the trailer. Problems similar to those encountered in unloading mixed freight occur in loading mixed freight onto trailers.

The results of such inefficiency, among other disadvantages, are that dock workers and unloading equipment are inefficiently employed, and the docks and truck trailers are tied up awaiting loading or unloading. Shipping costs are thereby increased and profits to the warehousing facility and/or trucking company are diminished.

SUMMARY OF THE INVENTION

The present invention provides a freight manipulator system including a swingable and tiltable cantilever boom for use in cooperation with a telescoping conveyor positioned below the manipulator in a mixed freight handling system. The mixed freight handling system combines a manipulator and a conveyor for each trailer dock position to facilitate loading and unloading mixed freight loads including mixes of hand liftable articles and heavier freight such as palleted items. The manipulator system generally includes a manipulator chassis mounted on parallel guide tracks in straddling relation to the conveyor and a cantilever boom connected by a two axis gimbals to the chassis to enable swinging of the boom laterally and tilting of the boom vertically. Freight engaging tools, such as fork tines, are mounted on a front end of the boom by an articulated tool carriage which allows raising and lowering the tools, pivoting about a vertical axis, tilting the tools vertically, and lateral shifting of the tools.

The structure of the manipulator chassis includes a boom support body mounted on four legs forming a tunnel through which the telescoping conveyor extends and retracts and through which articles on the conveyor pass. Flanged wheels are mounted on the legs and engage the guide tracks to guide movement of the manipulator. The rails have rack gears mounted therebelow, and the rear legs have rotary motors with spur gears which mesh with the rack gears to propel the manipulator.

The boom extends from the gimbals, located at a rear end of the top of the chassis, past a boom bearing structure at the front of the top of the chassis and is cantilever supported therefrom. The boom bearing structure includes a plurality of rollers mounted on the boom which engage a top surface of the chassis to provide for movable engagement of the boom during lateral swinging of the boom. Lateral swinging of the boom allows the fork tines to engage or offload freight articles at the lateral extremities of the truck trailer, such as near the trailer walls or the edges of a flat bed trailer. A pair of swing cylinders are pivotally connected to the chassis and have their rams connected by a chain which is also connected to the boom in the vicinity of the boom bearing structure. The swing cylinders are operated in opposition to laterally swing the boom. The boom bearing structure is provided with a pair of tilt cylinders positioned on opposite sides of the boom and connected between the bearing structure and the boom. The tilt cylinders are operated in unison to lift and lower the boom.

The tool carriage is connected to the boom by an extendible mast which includes an upper frame pivotally connected to the end of the boom for pivoting about a vertical axis. A pair of mast pivot cylinders are connected to the boom and have the ends of their rams connected by a chain. The chain is meshed with a sprocket connected to the upper frame. The pivot cylinders work in opposition to pivot the mast relative to the boom. The mast is formed by three telescoped mast frames. A middle frame has rollers engaging guide rails on the upper frame, and, similarly, a lower frame has rollers engaging guide rails on the middle frame. A tool frame has the fork tines mounted thereon and has rollers engaging guide rails on the lower frame.

A pair of secondary main lift cylinders of the mast are engaged between the upper frame and the middle frame. The middle frame has a pair of sprocketed pulleys mounted thereon, and a pair of lift chains engage the pulleys and have their ends connected between the upper frame and the lower frame. By this arrangement, as the cylinders extend to lower the middle frame, the chain and pulley arrangement causes corresponding lowering of the lower frame. A particular advantage of the configuration of the mast is that the overall lifting or lowering range of the preferred mast approaches double the stroke length of the mast lift cylinders.

A primary lift cylinder having a pair of sprocketed pulleys thereon has its ram connected to the top of the lower frame. A pair of tool carriage lift chains are connected between the lower frame and the tool frame and engage the pulleys. Extension of the tool carriage lift cylinder lowers the tool carriage while retraction of the cylinder lifts the tool carriage. The chain and pulley arrangement gives the tool carriage a lift range approximately twice the stroke length of the primary cylinder.

The fork tines are L-shaped and have their top ends pivotally and slidably received on a transverse tine support bar. A pair of tool tilt cylinders are connected to the tool frame on opposite sides thereof and have their rams connected by a tool tilt bumper extending across the tool frame. Extension and retraction of the tilt cylinders in unison tilts the fork tines relative to the tool frame. The fork tines are individually shiftable laterally. Each tine has a ram of a tool shift cylinder engaged therewith, the cylinder being connected to the tool frame. The tool shift cylinders may be operated individually, in unison, or in opposition to selectively position the tines laterally of the tool frame.

In a preferred embodiment of the manipulator, a fixed length boom is employed whereby the freight engaging tools are extended into the trailer entirely by movement of the manipulator chassis toward the trailer. In a modified embodiment of the manipulator, a telescoping boom is provided in which telescoping boom sections are extended and retracted by hydraulic cylinders. On a manipulator with an extendible boom, the tools may be extended into the trailer by a combination of the movement of the chassis and the extension of the boom. Retraction of the boom sections results in a compact structure for the modified manipulator.

OBJECTS AND ADVANTAGES OF THE INVENTION

The principal objects of the present invention are: to provide improved equipment for handling freight in a mixed freight handling system; to provide such equipment which is adapted for use with an extendible or telescoping conveyor which is translatable into a trailer for conveying manually liftable articles; to provide an independently translatable freight manipulator for use with such a conveyor which includes a chassis configured to straddle the conveyor, the manipulator being used for handling freight not suitable for manual handling, such as palleted loads and the like; to provide such a manipulator in which the boom is connected to the chassis by a gimbals allowing lateral swinging and vertical tilting of the boom to thereby enable engagement and depositing freight articles at a variety of vertical and lateral positions within a truck trailer; to provide such a manipulator in which the chassis is supported on manipulator tracks parallel to and outside of conveyor guide tracks and has a tunnel therethrough for passage of articles on the conveyor through the chassis and for independent translation of the manipulator relative to the conveyor; to provide such a manipulator including a tool carriage connected to the chassis by a cantilever boom which allows a freight engaging tool to be extended to the front end of a standard size trailer; to provide a modified embodiment of the manipulator employing a telescoping or extendible boom having the tool carriage mounted on an end thereof; to provide such a manipulator wherein a variety of freight engaging tools, such as fork tines and extensions, a drum clamp, a rug pole, a jib boom, or the like, are interchangeably connectible to the tool carriage for handling a variety of types of freight; to provide such a manipulator wherein the tool carriage is capable of a wide range of articulation, such as lifting of the fork tines, independent lateral shifting of fork tines, pivoting the tool carriage through at least 180 degrees about a vertical axis, tilting of the fork tines, and the like; to provide such a manipulator with such a tool carriage with a multiple stage negative lift arrangement, that is, an arrangement which is extended to lower the fork tines and retracted to lift the tines; to provide such a tool carriage which is connected to the boom by an extendible mast including an upper frame pivotally connected to the end of the boom for pivoting about a vertical axis, a middle frame slidably mounted on the upper frame, and a lower frame slidably mounted on the middle frame and having the tool carriage slidably mounted on the lower frame and on which the fork tines are mounted; to provide such a tool carriage mast in which a pair of secondary lift cylinders are connected between the upper frame and the middle frame, a pair of sprocketed pulleys are mounted on the middle frame, and a pair of chains are connected between the upper frame and the lower frame and engage the pulleys whereby, as the secondary cylinders are extended or retracted to respectively lower or raise the middle frame relative to the upper frame, the lower frame is respectively lowered or raised relative to the middle frame; to provide such a tool carriage mast wherein a primary lift cylinder has is connected to the top of the lower frame and has a pair of sprocketed pulleys mounted on a cylindrical shell connected to the ram thereof and a pair of primary lift chains are connected between the lower frame and the tool carriage frame and engage the pulleys whereby extension and retraction of the primary cylinder respectively lowers and raises the tool carriage; to provide such a tool carriage including a pair of tool shift cylinders connected to the tool carriage frame and engaging the fork tines respectively and operable independently or in cooperation to selectively position the tines laterally of the tool frame; to provide such a manipulator which may be controlled to perform certain automatic functions such as the translation of the chassis to the extremities of the manipulator tracks, translation of the chassis to a position to set off or pickup a unit of freight, interchanging of freight engaging tools, parking of the manipulator, and the like; to provide such a manipulator wherein the extendible conveyor, in an extended and lowered condition, may remain in the trailer without interference as the tool carriage of the manipulator is extended into the trailer to engage a unit of nonmanually liftable freight; to provide such a manipulator which can be operated by a single worker to load or unload a trailer; and to provide such a freight manipulator system with an articulated cantilever boom which is economical to manufacture, efficient and convenient in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary side elevational view of a mixed freight handling system including a freight manipulator with an articulated cantilever boom which embodies the present invention, with a vertically tilted position of the boom and a raised front end of a telescoping conveyor shown in phantom lines.

FIG. 2 is a view similar to FIG. 1 and shows the manipulator in an extended condition with freight manipulating tools positioned in a trailer and engaging a unit of freight, a lowered position of the tools and an extended condition of the telescoping conveyor being shown in phantom lines.

FIG. 3 is a top plan view of the mixed freight handling system with a laterally swung position of the boom and a laterally swung head end of the conveyor shown in phantom lines.

FIG. 6 is a view similar to FIG. 5 with portions broken away to illustrate further details of the swing motor arrangement and with swung positions of the boom shown in phantom lines.

FIG. 7 is a further enlarged fragmentary transverse sectional view taken on line 7—7 of FIG. 6 and illustrates details of sprockets and chains of the swing motor arrangement and a boom bearing assembly.

FIG. 8 is a transverse sectional view taken on line 8—8 of FIG. 4 and illustrates guide and support structure for the manipulator, the telescoping conveyor, and the fixed conveyor and cooperating relationships thereamong.

FIG. 9 is a greatly fragmentary enlarged side elevational view taken on line 9—9 of FIG. 8 and illustrates details of a drive mechanism for the manipulator chassis.

FIG. 10 is a greatly enlarged fragmentary transverse sectional view taken on line 10—10 of FIG. 9 and illustrates further details of the manipulator chassis drive mechanism and counterbalance rollers of the chassis.

FIG. 11 is a greatly enlarged fragmentary transverse sectional view taken on line 11—11 of FIG. 4 and illustrates details of a front wheel of the manipulator chassis.

FIG. 12 is an enlarged fragmentary side elevational view of the front end of the manipulator boom and illustrates details of the connection of a freight manipulator tool carriage to the boom.

FIG. 13 is an enlarged fragmentary top plan view of the front end of the manipulator boom and illustrates details of the guide arrangements among the component frames of an extendible mast of the tool carriage with portions of the boom broken away to illustrate a pivot motor assembly for the tool carriage mast.

FIG. 14 is a view similar to FIG. 12 and illustrates the tool carriage mast in an extended and lowered condition and further illustrates details of the frame lift motor arrangements of the tool carriage mast.

FIG. 15 is an enlarged front elevational view of the manipulator and illustrates further details of the tool carriage and mast with a lowered position of the tool carriage shown in phantom lines.

FIG. 19 is a fragmentary side elevational view of the system of the present invention incorporating a modified embodiment of the manipulator which employs an extendible boom formed of telescoping sections.

FIG. 20 is a view similar to FIG. 19 and illustrates the extendible boom with the telescoping sections retracted.

DETAILED DESCRIPTION OF THE INVENTION

Figure 4:
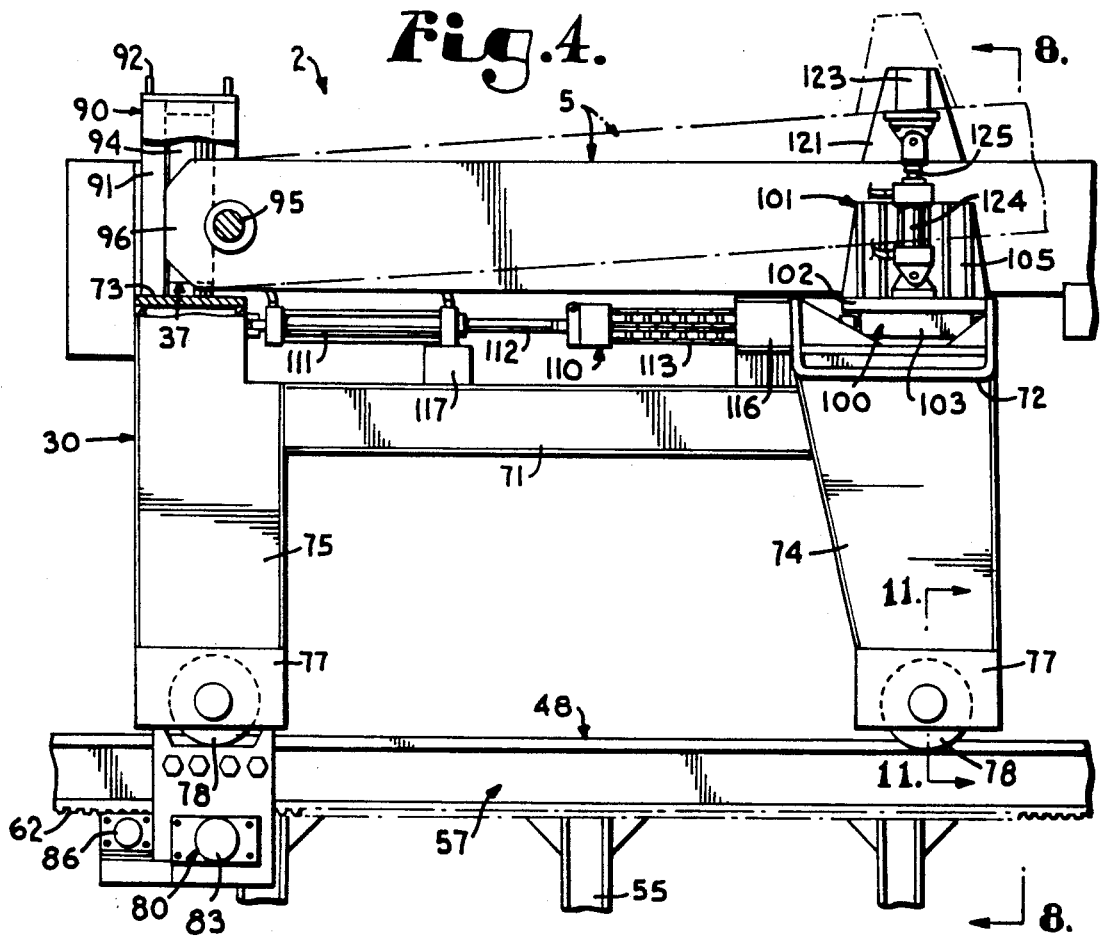
FIG. 4 is an enlarged fragmentary side elevational view of the manipulator with portions broken away to illustrate details of a gimbals connecting the boom to the manipulator chassis and with a tilted position of the boom illustrated in phantom lines.
Figure 5:
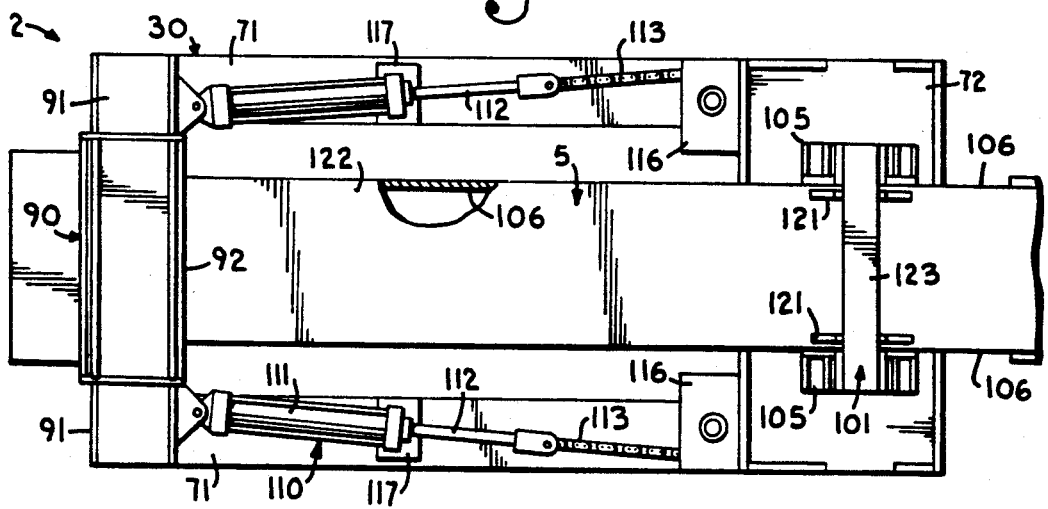
FIG. 5 is an enlarged fragmentary top plan view of the manipulator and illustrates details of hydraulic swing cylinders employed to swing the boom laterally.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a mixed freight handling system including a freight manipulator 2 which embodies the present invention. The system 1 also includes a telescoping conveyor 3 which cooperates with the manipulator 2 to load or unload mixed types of freight carried by a truck trailer 4. The freight manipulator 2 includes an articulated cantilever supported boom 5 with a tool carriage 6 mounted at an end thereof for loading or unloading freight articles 7 which are not capable of being handled manually. The telescoping conveyor 3 is provided to facilitate the loading or unloading of articles 8 which can be handled manually.

Referring to FIGS. 1–3, and 8, the extendible or telescoping conveyor 3 includes a rear base section 14, a middle lift section 15, and a front head section 16. The lift section 15 is pivotally connected to the base section 14, and the head section 16 is pivotally connected to the lift section 15, both for pivoting about respective axes transverse to a longitudinal extend to the conveyor 3. The head section 16 includes a rear pitch frame 18 which is pivotally connected to a front end 19 of the lift section 15 to allow a pitching or inclined relationship between the head and lift sections 15 and 16 and a front swing frame 20 pivotally connected to the pitch frame 18 for pivoting about a vertical axis, that is, for swing movements by the head section 16.

A set of conveyor lift struts 23 are connected to the lift section 15 and the head section 16 and are operable to raise the head section 16 to facilitate the manual transfer of articles 8 from the illustrated conveyor 3 to the trailer 4 or vice versa. The struts 23 are connected to the front end 19 of the lift section 15, and surface engaging wheels 25 are journaled at outer ends of the struts 23. A pair of hydraulic lift cylinders (not shown) are pivotally connected between the struts 23 and the pitch frame 18 of the head section 16. The struts 23 are pivoted downwardly as the lift section 15 is inclined, and links (not shown), which are connected between the struts 23 and the pitch frame 18, pivot the head section 16 downwardly in such a manner that it remains substantially horizontal when lifted.

The telescoping conveyor 3 cooperates with a fixed conveyor 27 which is illustrated to be positioned in overlapping relation to the telescoping conveyor 3. This arrangement allows the telescoping conveyor 3 to receive articles 8 from the fixed conveyor 27 for loading in the trailer 4. The system 1 may also be configured for unloading articles 8 from the trailer 4 with the telescoping conveyor 3 positioned overlapping the fixed conveyor 27 whereby the fixed conveyor 27 receives articles 8 from the telescoping conveyor 3. Further details of conveyors similar to the fixed conveyor 27 and the telescoping conveyor 3 are available in U.S. Pat. No. 5,008,560 referred to above.

The freight manipulator 2 generally includes a mobile chassis 30, the cantilever boom or boom assembly 5 mounted on the chassis 30, the tool support carriage 6 mounted at a front end 33 of the boom 5, and tool engaging tines or forks 35 mounted on the tool carriage 6. The boom 5 is pivotally connected to the chassis 30 by a gimbals 37 to allow pivoting about a vertical axis, or swinging, and pivoting about a horizontal axis, or tilting. The boom assembly 5 has a length to allow the forks 35 to reach freight 7 at a front end of a trailer 4 of certain standard lengths when the chassis 30 is positioned at its forwardmost position near an edge 44 of a dock 45.

Referring to FIGS. 1–3, 8 and 10, a guide means or guide and support assembly 48 for the fixed conveyor 27, the telescoping conveyor 3, and the freight manipulator 2 of the system 1 is illustrated. An elongated guide trench 49 is formed into a surface 50 of the dock 45 to receive the guide assembly 48. A plurality of cross beams or ties 53 are positioned across the trench 49 on support pads 54 at spaced locations along the trench 49. Each cross tie 53 has a pair of legs 55 upstanding therefrom to support a respective elongated guide rail assembly 57. Each of the illustrated guide rail assemblies 57 includes a lower plate 58, a tubular beam 59, and an upper plate 60 spaced upwardly from the lower plate 58 at approximately the same level as the surface 50 of the dock 45. The tubular beam 59 may, alternatively, be formed by a pair of inwardly facing and welded channel members. A lower surface 61 (FIG. 10) of the lower plate 58 has an elongated rack gear 62 mounted thereon which cooperates with the manipulator 2 for propulsion thereof, as will be detailed further below.

Portions of the fixed conveyor 27 are mounted on the upper plates 60 of the guide rail assemblies 57, or extensions thereof, in spaced relation above the telescoping conveyor 3. The telescoping conveyor 3 is supported on the upper plates 60 by way of rimmed wheels 64 positioned on opposite sides of the conveyor 3 and engaging inner edges of the upper plates 60. At least one of the wheels 64 has a conveyor motor (not shown) engaged therewith and operable to propel the conveyor 3 between a retracted condition spaced away from the trailer 4 and a fully extended condition in which the head section 16 and the lift section 15 of the conveyor 3 enter or invade the trailer 4. The guide assemblies 57 extend from a location at which the manipulator tines 35 are fully retracted from the trailer 4 to guide ends 66 (FIG. 2) spaced from the edge 44 of the dock 45 at which the manipulator tines 35 are able to reach a front end (not shown) of the trailer 4, of an appropriate size for the length of the boom 5, in a fully extended condition of the manipulator 2.

Referring to FIGS. 4–8, the manipulator chassis 30 is formed by a framework including a pair of longitudinal side beams 71 connected by a front cross beam 72 and a rear cross beam 73 (FIG. 6), a pair of front legs 74 depending from the front cross beam 72, and a pair of rear legs depending from the rear cross beam 73. The cross beams 72 and 73 and the legs 74 and 75 are positioned and spaced apart in such a manner as to define an article receiving clearance or tunnel 76 (FIG. 8) through the chassis 30 through which articles 8 on the fixed conveyor 27 and the telescoping conveyor 3 may pass without interference by portions of the chassis 30.

Referring to FIGS. 4 and 9–11, each of the legs 74 and 75 has a wheel frame 77 mounted at an end thereof with a respective rimmed wheel 78 journaled therein. The wheels 78 engage the upper and outer surfaces of the upper plates 60 of the guide assemblies 57. Each of the wheel frames of the rear legs 75 has a drive mechanism 80 mounted thereon for self-propulsion of the manipulator 2. Each of the illustrated drive assemblies 80 includes a drive mechanism support plate 82 depending from the associated wheel frame 77 of a rear leg 75. A rotary manipulator drive motor 83 is mounted on the plate 82 and has a drive gear 84 (FIG. 10) mounted on a shaft 85 thereof. The illustrated drive motors 83 are rotary hydraulic motors; however, other types of motors could be employed, such as electric motors. The drive gears 84 are meshed with the rack gears 62 mounted on the lower surfaces 61 of the lower plates 58 of the rail assemblies 57.

The chassis 30 includes at least one position sensor or resolver 86 associated with one of the drive assemblies 80, such as on the right side as illustrated, to determine the position of the manipulator 2 along the guide assembly 48. The sensor 86 includes a position sensor gear 87 (FIG. 9) which meshes with the rack gear 62. The use of the drive gears 84 and the sensor gear 87 in cooperation with the rack gear 62 provides for positive propulsion of the manipulator 2 and positive sensing of the position of the manipulator 2 for communication to a control system (not shown) of the mixed freight handling system 1. The position sensor 86 may be any type of appropriate mechanism operating by any conventional means for converting rotary motion into data representing linear position along the track assemblies 57, such as magnetic or photoelectric "click" counters, binary encoders, or the like.

The length and weight of the boom 5, the tool carriage 6, and any freight 7 carried by the tool carriage 6 create moments which tend to tip the manipulator 2 in the direction of the tool carriage 6. To counter such tipping tendencies, the chassis 30 is provided with counterbalance rollers 88 (FIG. 10) journaled on the support plates 82 on each rear leg 75 and engaging the lower surfaces of the upper plates 62 of the rail assemblies 57.

Referring particularly to FIGS. 4 and 6, the gimbals 37 is mounted in a gimbals frame 90 formed by the rear cross beam 73, a pair of opposite side members 91, and a top cross member 92. A swing pin 93 (FIG. 6) is affixed between the top member 92 and the rear cross beam 37 and has a swing sleeve 94 rotatably received thereon. A tilt pin 95 is attached to the swing sleeve 94, as by welding, and has a rear end 96 of the boom 5 pivotally mounted thereon. The gimbals 37 provides the boom 5 with pivoting capability in two axes: swinging about a vertical axis formed by the swing pin 93 and tilting about horizontal axis formed by the tilt pin 95.

The manipulator boom 5 is supported on the chassis 30 by the gimbals 37 and the gimbals frame 90 and by a boom bearing assembly 100, which also forms a boom lift assembly on the illustrated manipulator 2. Referring to FIGS. 4-8, the boom bearing assembly 100 includes a bearing frame 101 formed by a lower plate 102 positioned on a roller block 103 having, as illustrated, four boom bearing rollers 104 journaled thereon. The rollers 104 engage an upper surface of the front cross beam 72 of the chassis 30. A pair of laterally spaced boom swing abutments 105 are positioned in upstanding relation from the lower plate 102 adjacent opposite side walls or sides 106 of the boom 5 and are engaged by the sides 106 of the boom 5 during swinging movements thereof to transfer motion to the bearing frame 101. A lower wall 107 of the boom 5 engages and rests on the lower plate 102 of the boom bearing frame 101.

FIGS. 4-7 illustrate a swing motor mechanism 110 for swinging the boom 5 to the left and right about the swing pin 93. In the illustrated manipulator 2, a pair of swing cylinders 111 are connected to the outer ends of the rear cross beams 73. Rams 112 of the swing cylinders 111 are interconnected by a swing sprocket chain 113 which is connected to the boom 5 in the vicinity of the boom bearing assembly 100 by a swing anchor 114 (FIG. 7). The swing chain 113 passes about a pair of swing sprockets 115 which are rotatably mounted in swing sprocket brackets 116 affixed between the front cross beam 72 and the chassis side beams 71 on each side of the chassis 30. Front ends of the cylinders 111 rest on swing cylinder support blocks 117 mounted on the chassis side beams 71.

The swing cylinders 111, which are preferably hydraulic, are operated in opposition, one extending while the other retracts, to pivot the boom 5 about the vertical swing pin 93 to thereby swing the tool carriage 6 to the right or left of a centerline position of the boom 5. The swinging capability of the boom 5 of the manipulator 2 of the present invention allows the freight engaging tools or tines 35 to be moved through the lateral extremities of the trailer 4 to engage freight articles 7 at any lateral position between side walls 118 (FIG. 2) of the trailer 4 with a relatively narrow width of the tool carriage 6. As the boom 5 is swung, the sides 106 of the boom 5 engage the abutments 105 such that the boom bearing assembly 100 is moved with the boom 5 to support the boom on the chassis 30 during such movements. On the illustrated manipulator 2, the boom 5 has a swinging range of approximately nine degrees to the left and to the right of a centerline position of the boom 5.

Referring to FIGS. 4-8, a boom tilt motor mechanism 120 is connected to and cooperates with the boom bearing frame 101. A pair of boom tilt brackets 121 are affixed in upstanding relation to an upper wall 122 of the boom 5 or, alternatively, to the side walls 106 of the boom 5. A boom tilt cross beam 123 is connected to the brackets 121 and extends outwardly of the brackets 121. A pair of boom tilt cylinders 124 are connected to the lower plate 102 of the boom bearing frame 101 and have their rams 125 connected to the ends of the cross beam 123. The cylinders 124 are operated in unison to tilt the boom 5 about the horizontal tilt pin 95. On the illustrated manipulator 2, the tilt range of the boom 5 is from substantially horizontal to about two degrees above horizontal. The tilting capability of the boom 5 is not strictly necessary for effective employment of the manipulator 2 to handle the freight articles 7. However, the ability to tilt the boom 5 provides an extra degree of vertical range for the tool carriage 6 and the tools 35 of the manipulator 2.

The illustrated manipulator boom 5 includes a rear section 130 and a front section 131 (FIGS. 1-3). The rear section 130 is of a constant rectangular cross section. The front section 131 diminishes in rectangular cross section from the rear section 130 to a front end 33 of the boom 5 to reduce the weight of the front end 33. The illustrated boom 5 is of a built-up box beam configuration formed by a lower channel including a web forming the lower wall 107 and side flanges forming the side walls 106 with a top plate welded on the top edges of the side walls 106 and forming the top wall 122. Internal reinforcing members (not shown) strengthen the boom structure to extend a substantial length, in a cantilever manner, forward of the boom bearing assembly 100. Alternatively, other types of cantilever beam configurations may be employed on the manipulator 2 of the system 1. In particular, while the boom 5 is described and illustrated as a fixed length boom, it could also be configured as an extendible boom, as will be described further below.

Preferably, the boom 5 is of a length to enable the fork tines 35 to reach freight articles 7 positioned at a front end (not shown) of the trailer 4 of a standard length. The manipulator 2 of the present invention, with a fixed length boom 5, is intended principally for loading and unloading freight articles 7 from relatively shorter types of trailers 4, such as "city" trailers having lengths of about 32 feet and "pup" trailers having lengths of about 27 to 28 feet. Longer "line haul" trailers, having lengths of 45 to 48 feet, are best accommodated by telescoping, non-cantilever booms, such as disclosed in U.S. Pat. No. 5,009,560.

Figure 16:
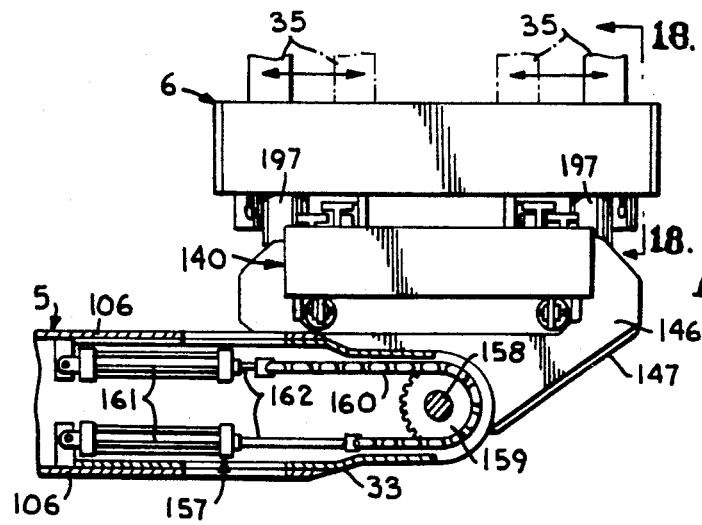
FIG. 16 is a view similar to FIG. 13 at a somewhat reduced scale and illustrates the tool carriage in a pivoted position about a vertical axis relative to the boom, with alternate positions of fork tines thereof shown in phantom lines.
Figure 17:
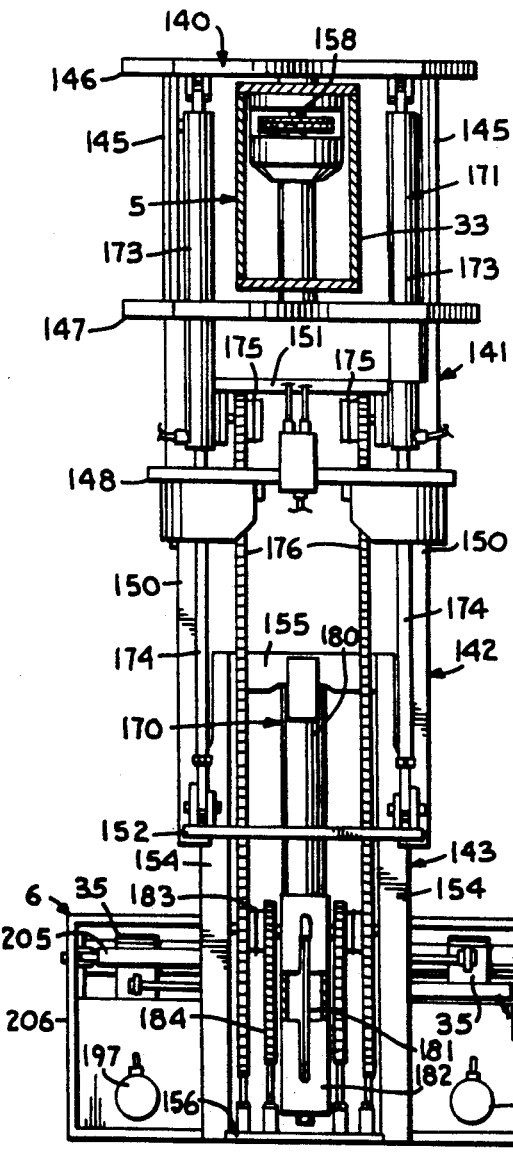
FIG. 17 is an enlarged transverse sectional view taken on line 17—17 of FIG. 13 and illustrates details of the tool carriage mast as viewed from the rear thereof.

FIGS. 12-18 illustrate a multiple stage freight lift apparatus or mast 140 of the manipulator 2 of the system 1 and its cooperation with the boom 5. The mast 140 comprises three telescoped lift frames including an upper frame 141, a middle frame 142, and a lower frame 143. The upper frame 141 includes a pair of spaced apart vertical side rails 145 connected by an upper cross plate 146, a middle cross plate 147, and a lower cross member 148 (FIG. 17). The middle frame 142 includes a pair of side rails 150 connected by an upper cross member 151 and a lower cross member 152. Similarly, the lower frame 143 includes a pair of side rails 154 connected by an upper cross member 155 and a lower cross member 156.

Referring to FIGS. 12, 13, and 16, the mast 140 is pivotable about a vertical axis by operation of a mast pivot mechanism 157. The upper and lower cross plates 146 and 147 of the upper frame 141 have a vertical mast pivot shaft 158 connected therebetween. The shaft 158 is pivotally mounted in the front end 33 of the boom 5. A mast sprocket 159 is affixed to the shaft 158 and has a sprocket chain 160 meshed therewith. A pair of mast pivot cylinders 161 are connected to the side walls 106 of the front end 33 of the boom 5 and have rams of the cylinders 161 interconnected by the chain 160. The cylinders 161 are operated in opposition, in a manner similar to the swine cylinders 111, to pivot the mast 140 about a vertical axis formed by the shaft 158. As is illustrated in FIG. 16, the pivot mechanism 157 provides the mast 140 and the tool carriage with at least a 90 degree pivot range to each side of the boom 5, enabling the manipulator to deposit or engage freight articles 7 along the sides of the guide assembly 48 of the system 1.

The side rails 145, 150, and 154 form guide tracks on their respective frames 141, 142, and 143 of the mast 140. Referring to FIG. 13, the illustrated side rails 145 of the upper frame 141 are inwardly turned channels, while the side rails 150 and 154 of the middle and lower frames 142 and 143 respectively have I-shaped cross sections. The side rails 150 of the middle frame 142 have rollers 165 mounted thereon at upper and lower locations and engage the side rails 145 of the upper frame 141. Similarly, the side rails 154 of the lower frame 143 have rollers 166 which engage the side rails 150 of the middle frame 142. The fork tines 35 are mounted on the tool carriage 6 having rollers 168 which engage the side rails 154 of the lower frame 143.

The mast 140 includes a primary lift mechanism 170 to lift the tool carriage 6 relative to the mast 140 and a secondary lift mechanism 171 to extend and retract the mast frames 142 and 143 relative to the upper frame 141 to respectively lower and raise the tool carriage 6 and thereby extend its lift range. The secondary lift mechanism 171 includes a pair of hydraulic secondary lift cylinders 173 connected to the upper cross plate 146 of the upper frame 141 and having rams 174 connected to the lower cross member 152 of the middle frame 142. A pair of laterally spaced sprocket pulleys 175 are mounted on the middle frame 142 near the upper cross member 151 thereof and have a pair of secondary lift sprocket chains 176 meshed respectively therewith. Each of the chains 176 is connected between the lower cross member of the upper frame 141 and the lower cross member 156 of the lower frame 143. Upon extension of the cylinders 173, the middle frame 142 is lowered relative to the upper frame 141 thereby lowering the pulleys 175. As the pulleys 175 are lowered, the lower frame 143 is lowered correspondingly by way of the chains 176. Retraction of the cylinders 173 reverses the process to raise the lower frame 143 and middle frame 142 relative to the upper frame 141. The secondary lift mechanism 171 has an extension capability comparable to approximately double the stroke length of the cylinders 173.

Referring to FIGS. 14 and 17, the illustrated primary lift mechanism 170 includes a single hydraulic primary lift cylinder 180 which is connected to the upper cross member 155 of the lower frame 143. A ram 181 of the cylinder 180 has a cylindrical shell 182 connected to a lower end thereof. The shell 182 provides a mounting for a pair of primary lift sprocket pulleys 183 which are trunnion mounted on opposite sides of a top end of the shell 182. Primary lift sprocket chains 184 are meshed respectively with the sprockets 183, and each has one end connected to the lower cross member 156 of the lower frame 143 and the opposite end connected to an anchor 185 on the tool carriage 6. When the cylinder 180 is retracted, the tool carriage 6 is raised to the top of the lower frame 143. Conversely, extension of the cylinder 180 lowers the tool carriage 6 to the bottom of the lower frame 143. Thus, the tool carriage 6 has a lift range approximately twice the length of the stroke of the cylinder 180.

Figure 18:
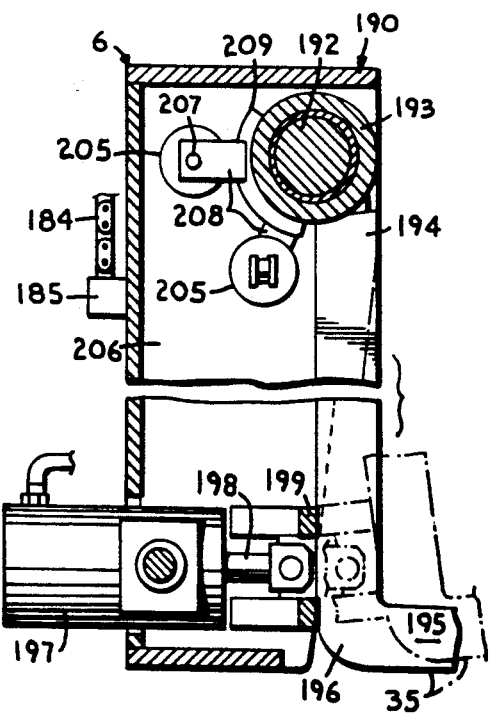
FIG. 18 is a greatly enlarged fragmentary longitudinal sectional view taken on line 18—18 of FIG. 16 and illustrates details of fork tine shifting cylinders and fork tine tilting cylinders of the tool carriage, with a tilted position of a tine shown in phantom lines.

Referring to FIGS. 15, 17, and 18, the tool carriage 6 includes a tool carriage frame 190 having the rollers 168 mounted on brackets 191 extending rearwardly therefrom. A tool support bar 192 extends across the frame 190 and has upper mounting sleeves 193 (FIG. 18) of the fork tines 35 rotatably and slidably received thereon. Each of the tools or tines 35 is substantially L-shaped and includes an upper leg 194 connected to a lower foot 195 at a heel region 196 of the tine 35. The mounting sleeves 193 are positioned at top ends of the legs 194. A pair of fork tilt cylinders 197 are pivotally mounted on the frame 190 and have rams 198 thereof connected by a fork tilt bumper 199 extending across the frame 190 at a lower end. The bumper 199 engages the tines 35 at the heel regions 196 such that extension of the cylinders 197 causes outer ends 200 (FIG. 14) of the tines 35 to be tilted upwardly. The tines 35 are generally tilted upwardly after engaging a freight article 7 to positively retain a freight article 7 thereon and prevent the article 7 from slipping off the tines 35. The tines 35 are tilted back to a horizontal orientation when the freight article 7 is deposited to facilitate withdrawal of the tines therefrom.

The tines 35 are independently shiftable laterally to maximize the flexibility of the manipulator in engaging freight articles 7. A pair of tine shift cylinders 205 are connected to opposite side walls 206 of the frame 109 and are oriented in opposite lateral directions. Each cylinder 205 has a ram 207 including a tab 208 at its outer end which is oriented to engage pair of tool shift abutments 209 formed on the sleeve 193 of an associated tine 35. Extension of the cylinders 205 positions the tines 35 at their maximum spread, while retraction of the cylinders 205 draws the tines 35 closest to a centerline of the tool carriage frame 190.

Preferably, the manipulator propulsion motors 83, the boom swing cylinder 111, the boom tilt cylinders 124, the mast pivot cylinders 161, the secondary mast lift cylinders 173, the primary mast lift cylinder 180, the fork tilt cylinders 197, and the fork shift cylinders 205 of the manipulator 2 are all hydraulic. Hydraulic fluid may be supplied to and returned from the various hydraulic motors of the mobile manipulator 2 in any conventional manner. As is diagrammatically illustrated in FIG. 8, a flexible conduit 211 carries hoses (not shown) which supply hydraulic fluid to the various motors of the manipulator 2 and also electrical cables (not shown) by which the manipulator 2 is controlled. Alternatively, a hydraulic pump and reservoir (not shown) may be mounted on the chassis 30 to supply the motors of the manipulator 2 whereby the conduit 211 only carries power cables (not shown) and control cables.

A conduit channel 212 extends along the guide assembly 48 and is supported by pads 213 positioned on a floor of the guide trench 49 and brackets 214 which are connected to the cross ties 53. The conduit 211 is mechanically connected to one of the drive mechanism support plates 82. The conduit 211 lies in the channel 212 and flexes upwardly to follow forward movements of the manipulator 2 toward the dock edge 44. Reverse movements of the manipulator 2 return the conduit 211 to the channel 212.

FIGS. 19 and 20 illustrate a modified embodiment 220 of the manipulator of the freight handling system 1 of the present invention which is provided with a telescoping extendible boom assembly 221 which is cantilever mounted on a chassis 222 of the modified manipulator 220. The chassis 222 is substantially similar to the chassis 30 of the manipulator 2 and has two axis gimbals 223 connecting the boom assembly 221 thereto and a boom bearing assembly 224 movably supporting the boom assembly 221 thereon. The chassis 222 includes a pair of boom swing cylinders 225 to laterally swing the boom assembly 221 and a pair of boom tilt cylinders 226 to tilt the boom assembly 221.

The illustrated boom assembly 221 includes an outer rear section 230 having an inner front section 231 telescoped thereinto. The front section 231 is supported by an external bearing structure 232 mounted on the front end of the rear section 230 and has a similar type of bearing (not shown) mounted on an upper side thereof which engages the inside of an upper wall of the rear section 230. The illustrated boom assembly 221 has a pair of boom extension cylinders 233 connected between the rear section 230 and the front section 231 external to the sections 230 and 231. Alternatively, a single cylinder (not shown) could be connected between the boom sections 230 and 231 within the boom assembly 221.

The manipulator 220 has freight engaging tools 235 mounted on a tool carriage 236 connected by an extendible mast 237 to the front end 238 of the front section 231. The mast 237 may be substantially similar to the mast 140 of the manipulator 2. The extendible boom assembly 220 allows the tools 235 to be extended into a trailer 240 to engage freight articles 241 by a combination of the movement of the chassis 222 and extension of the boom assembly 221. Additionally, the extendible boom 221 when retracted results in a more compact manipulator 220 than the manipulator 2 with the fixed length boom 5, although the extendible boom 221 is somewhat more complex and requires more complex handling of hydraulic hoses (not shown) to service the mast 237 and tool carriage 236.

It is to be understood that while certain forms of the present invention have been illustrated and described herein, it is not to be limited to the specific forms or arrangement of parts described and shown.

What is claimed and desired to be secured by Letters Patent is as follows:

1. A lift mechanism for transferring articles between a first location within an elongated interior of an article transporting vehicle and a second location external to said first location, said mechanism comprising:
   (a) manipulator chassis means including mobile ground engaging means;
   (b) an elongated boom pivotally connected to said chassis means to enable pivoting relative to said chassis means, said boom being spaced vertically from said ground engaging means and having a boom end;
   (c) manipulator motor means drivingly engaged between said chassis means and said ground engaging means and operable to propel said chassis means on a support surface of said chassis means; and
   (d) a lift apparatus including:
      (1) extendible mast means pivotally connected to said boom end to enable pivoting said mast means about a substantially vertical axis;
      (2) pivot motor means connected between said boom and said mast means and operable to pivot said mast means about said vertical axis;
      (3) a tool carriage movably mounted on said mast means and operable to move vertically relative to said mast means;
      (4) a pair of fork tines operatively connected to said tool carriage, said fork tines being adapted to engage an article to enable lifting thereof by said lift apparatus;
      (5) tilt means operatively engaged between said fork tines and said lift carriages and operable to tilt said fork tines relative to said lift carriage; and
      (6) lateral shift means operatively engaged between said fork tines and said lift carriage and operable to shift said fork tines laterally of said lift carriage.

2. An apparatus as set forth in claim 1 wherein said mast means includes:
   (a) a plurality of mutually telescoped mast frames.

3. An apparatus as set forth in claim 1 wherein:
   (a) said mast means is configured to extend downwardly and retract upwardly.

4. A mechanism as set forth in claim 1 wherein:
   (a) said boom is extendible relative to said chassis means.

5. A mechanism as set forth in claim 1 wherein:
   (a) said boom is extendible relative to said chassis means.

* * * * *